United States Patent [19]

Pontis

[11] Patent Number: 4,726,577
[45] Date of Patent: Feb. 23, 1988

[54] TILTING FIXTURE SYSTEM FOR USE ON A MACHINING CENTER

[75] Inventor: Paul R. Pontis, Tipp City, Ohio

[73] Assignee: Process Equipment Company, Tipp City, Ohio

[21] Appl. No.: 794,397

[22] Filed: Nov. 4, 1985

[51] Int. Cl.$^4$ .............................................. B23Q 1/04
[52] U.S. Cl. ....................................... 269/71; 269/60
[58] Field of Search ....................... 269/55, 58, 60, 63, 269/69, 70, 71, 73, 74; 408/89, 67; 409/221, 224, 219, 137

[56] References Cited

U.S. PATENT DOCUMENTS

| | | | |
|---|---|---|---|
| 1,414,970 | 5/1922 | Nelson | 269/60 X |
| 2,627,109 | 2/1953 | Bock et al. | 269/73 X |
| 2,639,541 | 5/1953 | Le Tang | 108/7 |
| 3,168,003 | 2/1965 | Muller et al. | |
| 3,290,039 | 12/1966 | Lancaster | 269/60 X |
| 3,788,633 | 1/1974 | Cho | 269/60 |
| 3,822,959 | 7/1974 | Tabard | 408/89 |
| 4,592,430 | 6/1986 | Hall et al. | 173/12 |
| 4,611,797 | 9/1986 | Cetnarowski | 269/58 X |

FOREIGN PATENT DOCUMENTS 537313 12/1955 Italy ...................................... 409/219

Primary Examiner—Frederick R. Schmidt
Assistant Examiner—Judy J. Hartman
Attorney, Agent, or Firm—Jacox & Meckstroth

[57] ABSTRACT

The six sides or angles surfaces of a part are automatically machined on a CNC or NC machining center by securing the part to a fixture plate which is mounted on a platen supported by a U-shaped frame for tilting movement between horizontal and vertical positions. The frame is secured to a pallet of the machining center, and the platen is tilted in response to rotation of twin ball screws driven by a wrench transferred to the spindle of the machining center by an automatic tool changer. In each position, the platen is precisely located and clamped to the frame by a plurality of units each including a shot pin which has a threaded end portion for engaging a corresponding nut within the platen in response to rotation by a dual-torque wrench also transferred to the spindle by the tool changer.

27 Claims, 12 Drawing Figures

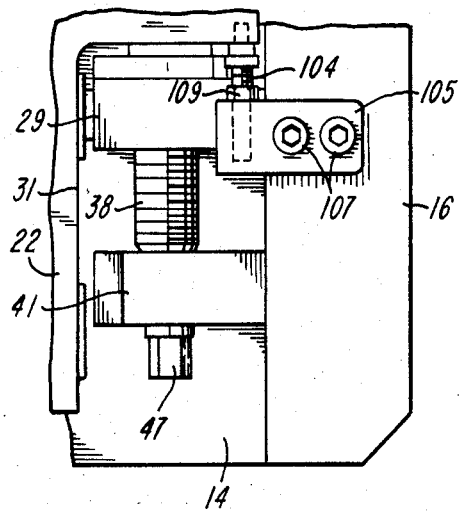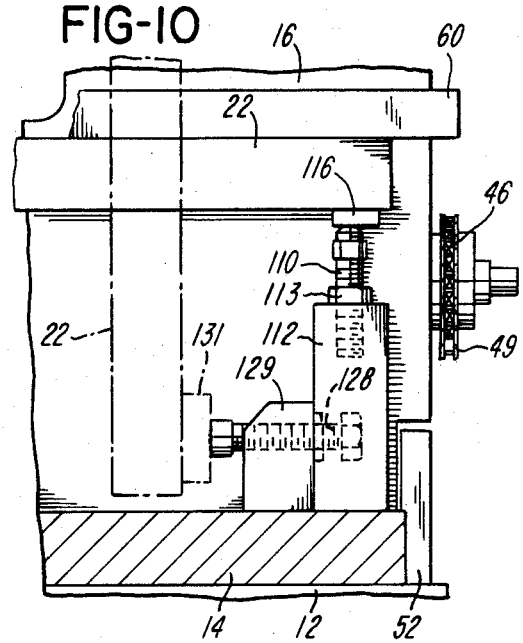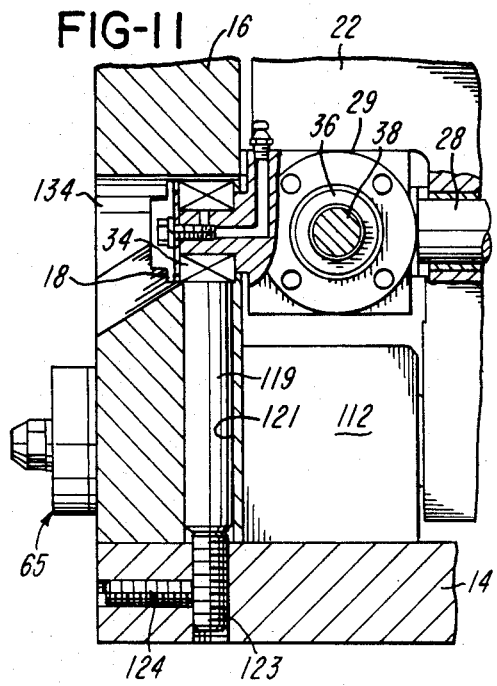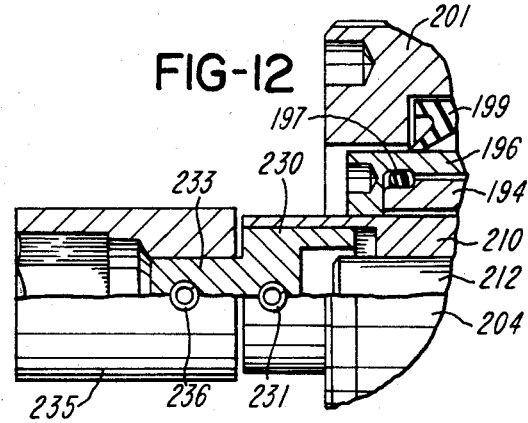

TILTING FIXTURE SYSTEM FOR USE ON A MACHINING CENTER

BACKGROUND OF THE INVENTION

In the use of a numerically controlled (NC) or a computer numerically controlled (ONC) machining center, for example, such as the Model T-30 machining center produced by Cincinnati Milacron, a set of pallets are supported by an indexing table and are selectively moved to a machining station adjacent a vertically and horizontally movable horizontal spindle. A series of machining tool elements are supported by supply magazines and are selectively transferred to the spindle by an automatic tool changer according to a predetermined sequence as determined by the machine or computer program. When such a machining center is used for machining production parts, usually each part is supported by a corresponding specific fixture which is mounted on a pallet at a loading and unloading station.

When it is necessary to machine five or six sides of a part, the part is commonly secured to one fixture plate for machining one to four sides of the part after which the part is removed from the fixture plate and secured in a different orientation to another fixture plate which is mounted on a pallet and then indexed to the machining station. The set up time required for loading and unloading each part onto each fixture plate and for loading and unloading each fixture plate onto the pallet is substantial and significantly increases the total time and cost of machining a part which requires reorientation relative to the spindle to complete all machining operations on the part. Furthermore, each time a part is removed from one fixture plate and mounted on another fixture plate, the part is exposed to the possibility of damaging a machined surface, thus requiring further machining or scrapping of the part.

SUMMARY OF THE INVENTION

The present invention is directed to an improved fixture system which is ideally suited for use on a program controlled machining center and which significantly reduces the setup time for fixturing a part requiring the machining on five or six sides or on at least two sides disposed at an angle to each other. As a result, the fixture system of the invention substantially reduces the cycle time for completely machining such a part and thus provides for more accurate and efficient machining of a supply of production parts. The apparatus and method of the invention also reduces the inventory of fixtures required for machining various parts and provides for completely automatic machining of all sides of a part on a program control machining center without requiring that the part be unloaded or removed from one fixture and then reloaded or remounted onto another fixture to complete all machining of the part.

In accordance with one embodiment of the invention, each part to be machined is secured to a fixture plate which is mounted on the platen of a fixture assembly supported by a moveable pallet of a machining center. The fixture assembly includes a base member or frame which supports the platen for tilting movement between a horizontal position and a vertical position. A pair of ball screws shift the platen between the horizontal and vertical positions, and the ball screws are rotated by a special wrench which is transferred by the automatic tool changer of the machining center to the horizontal spindle.

After the platen is shifted to either its vertical or horizontal position, the platen is precisely located and clamped to the base member by a set of four locating shot pins which are threaded into the platen by a special torque wrench transferred to the spindle by the automatic tool changer. The torque wrench provides for a higher torque when the wrench is driven counterclockwise or in the opposite direction by the spindle to loosen the shot pins and unthread them from the platen. Thus the clamping and unclamping of the platen and the movement of the platen between its horizontal and vertical positions is fully controlled automatically by the machining center as part of the program controlled sequence of operations which include all of the machining operations.

Other features and advantages of the invention will be apparent from the following description, the accompanying drawings and the appended claims.

BRIEF DESCRIPTION OF THE DRAWINGS

FIG. 9 is a plan view of the lower right corner portion of the fixture system shown in FIG. 1 and showing the addition of a platen stop device;

FIG. 10 is a fragmentary section taken generally on the line 10—10 of FIG. 1;

FIG. 11 is a fragmentary section taken generally on the line 11—11 of FIG. 1 showing the platen in its vertical position; and FIG. 12 is an enlarged fragmentary section of a modified socket driving portion for the wrench shown in FIG. 7.

DESCRIPTION OF THE PREFERRED EMBODIMENT

Figure 1:
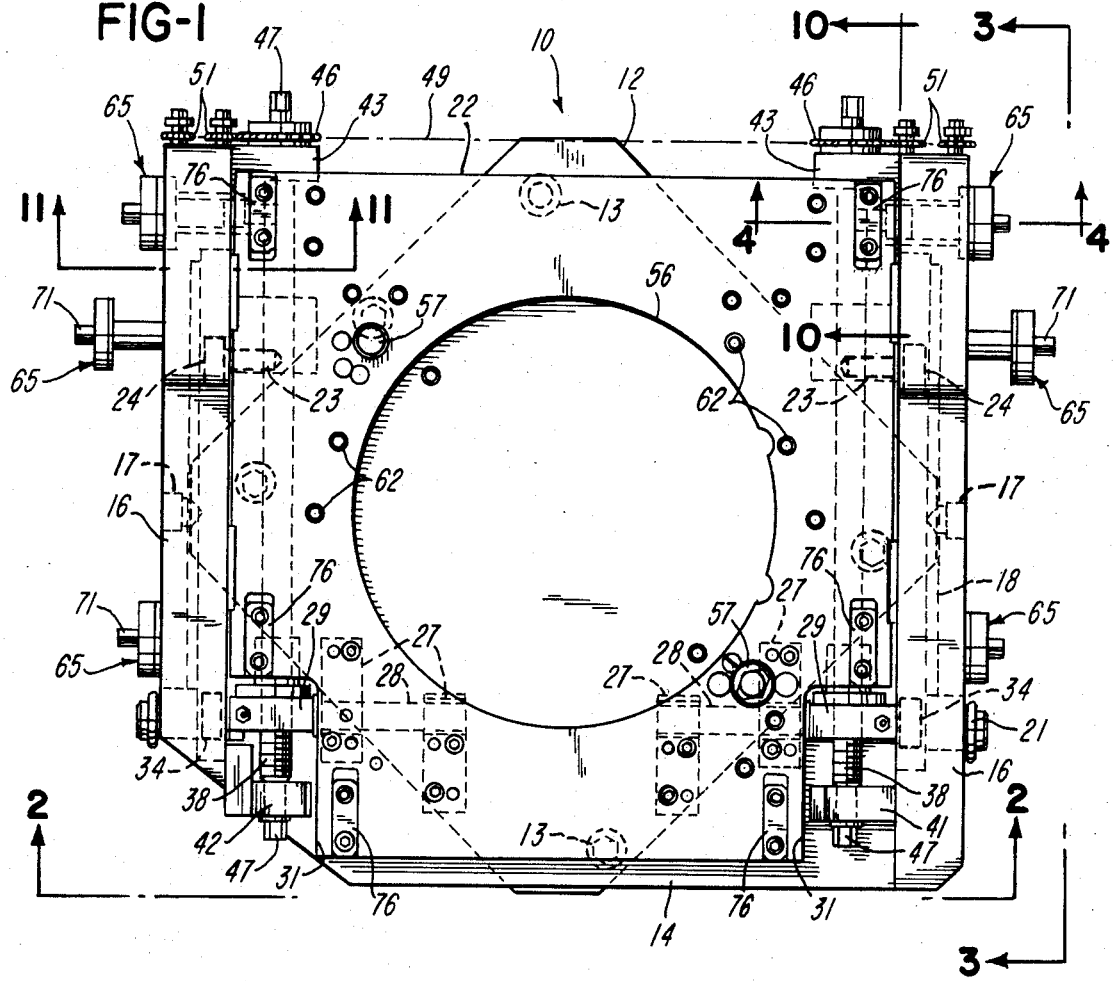
FIG. 1 is a plan view of a tilting fixture assembly constructed in accordance with the invention.
Figure 2:
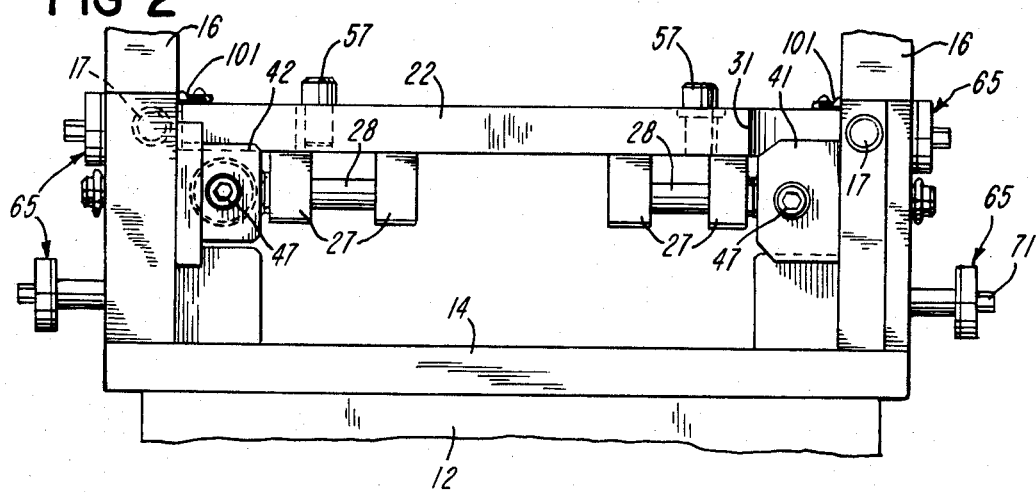
FIG. 2 is a front elevational view of the lower portion of the fixture assembly taken generally on the line 2—2 of FIG. 1.
Figure 3:
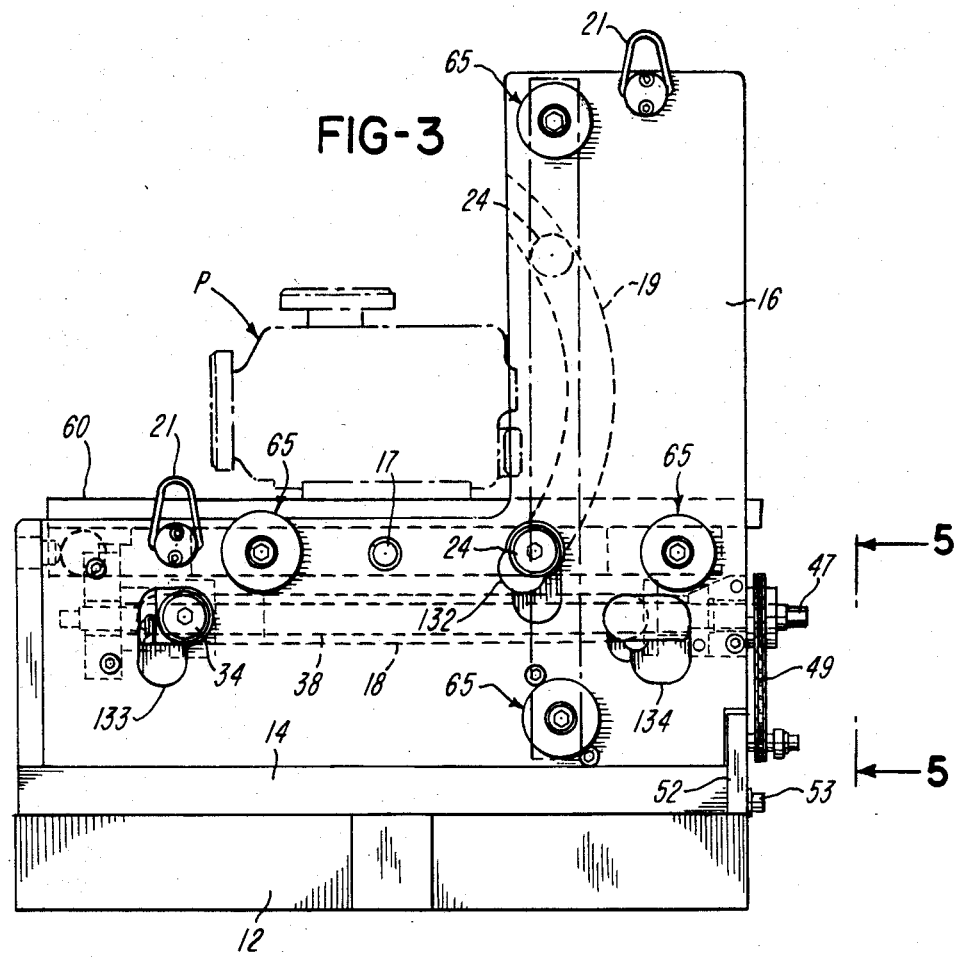
FIG. 3 is a side elevational view of the fixture assembly as taken generally on the line 3—3 of FIG. 1 and illustrating a part supported for machining.

FIGS. 1-3 show a fixture assembly 10 which is adapted to be mounted on and a pallet 12 of a machining center such as the Model T-20 or Model T-30 CNC Machining Center produced by Cincinnati Milacron mentioned above. The fixture assembly 10 is constructed of steel and includes a base member or plate 14 which is accurately located to the pallet 12 by keys (not shown) and is secured to the pallet 12 by screws 13. The base plate 14 rigidly connects two L-shaped side members or walls 16 to form a U-shaped frame. A set of hardened bushings 17 (FIGS. 1 and 2) with pointed holes are recessed in the side walls 16 to provide for accurately relocating the fixture assembly 10 in the event of a power failure. A horizontal groove or track 18 (FIG. 3) is formed within the inner surface of the lower portion of each side wall 16, and an arcuate cam slot or track 19 is formed within the upper portion of each side wall 16. A set of lifting loops 21 are secured to each side wall 16 for transporting the fixture assembly.

A flat platen 22 is spaced above the base plate 14 and extends between the side walls 16 of the fixture assembly 10. A pair of shafts 23 (FIG. 1) are carried by the rearward portion of the platen 22 and project outwardly to support corresponding anti-friction rollers 24 located within the lower end portion of the arcuate cam slots 19. A set of brackets 27 (FIG. 2) are secured to the bottom surface of the forward end portion of the platen 22, and each pair of brackets 27 supports a rotatable shaft 28 which projects outwardly to support a block 29 (FIGS. 1 and 11) located within a recess or notch 31 (FIG. 1) formed within the corresponding front corner of the platen 22. The platen 22 is free to rotate on the shafts 28, and the blocks 29 have projections which support corresponding anti-friction rollers 34 (FIG. 1) located within the horizontal slots or tracks 18 in the side walls 16 of the fixture assembly 10.

Figure 5:
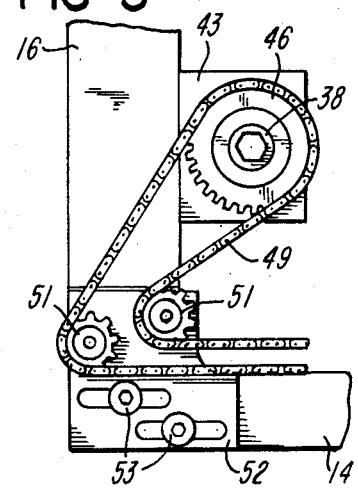
FIG. 5 is a fragmentary elevational view as taken generally on the line 5—5 of FIG. 3.

Each of the blocks 29 carries a threaded nut member 36 which receives an elongated horizontal ball screw 38. The forward end portions of the screws 38 are rotatably supported by corresponding bearing blocks 41 and 42 (FIG. 1) which are mounted on the side walls 16. The rearward end portion of each ball screw 38 is rotably supported by a bearing block 43 and carries a corresponding sprocket 46. The opposite ends of each ball screw 38 are formed with hexagonal projections 47 for driving or rotating the ball screws from either end. As illustrated in FIGS. 1, 3 and 5, an endless chain 49 connects the sprockets 46 and extends around two pairs of idler sprockets 51 supported for rotation by adjustable plates 52 each secured to the base plate 14 by screws 53. Thus when either end of one of the ball screws 38 is driven, both of the ball screws 38 rotate in unison.

Referring to FIGS. 1-3, the platen 22 has a circular center opening 56 and carries a pair of upwardly projecting locating studs 57 which mate with corresponding holes in a fixture plate 60 (FIG. 3) rigidly secured to the platen 22 by a set of screws extending into threaded holes 62 within the platen 22. The fixture plate 60 is designed to support a part P to be machined, such as the pump housing illustrated in FIG. 3. The fixture plate 60 has an opening (not shown) under the part P to provide access through the fixture plate to the bottom surface or opening which requires machining.

The fixture system provides for moving or tilting the platen 22, fixture plate 60 and the attached part P between a horizontal position (FIG. 3) and a vertical position (shown by phantom lines in FIG. 3) in response to rotating the ball screws 38. When the ball screws 38 are rotated in one direction, the rollers 24 on the rearward portion of the platen 22 move upwardly within the arcuate cam slots or tracks 19, and the rollers supporting the forward end portion of the platen 22 move rearwardly in the horizontal slots or tracks 18 until the platen 22 is in its vertical position. In the horizontal position of the platen 22, four sides of the part P may be machined on the machining center by indexing the pallet 12. In the vertical position of the platen 22, the remaining two sides of the part P may be machined by indexing the pallet.

When the platen 22 is in either its horizontal position or its vertical position, it is important that the platen be precisely located and rigidly clamped or locked to the side walls 16 of the fixture assembly 10 to prevent any vibration or minute movement of the part. This is accomplished by the incorporation of four alignment or locating and clamping units 65 (FIG. 4) mounted on each of the side walls 16 of the fixture assembly. Two of the units 65 on each side wall 16 are used to locate and clamp the platen 22 to the side wall when the platen is in its horizontal position, and two of the units 65 on each side wall are used to locate and clamp the platen 22 to the side wall 16 when the platen 22 is in its vertical position.

Figure 4:
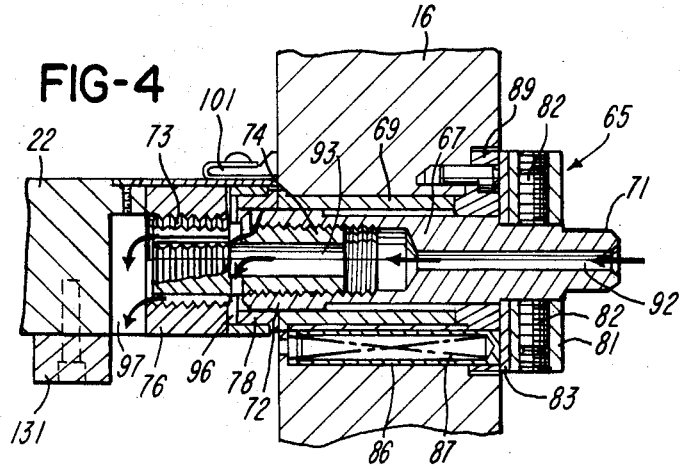
FIG. 4 is a fragmentary section taken generally on the line 4—4 of FIG. 1 and showing a locating and clamping unit.

Referring to FIG. 4, each of the locating and clamping units 65 includes a harden steel shot or locating pin 67 which is supported for sliding movement within a bushing 69 pressed into a hole within the side wall 16. The pin 67 has an outwardly projecting hexagonal drive end portion 71 and a precisionly ground opposite end portion 72. An externally threaded screw member 73 has a shank portion 74 threaded into the end portion 72 of the pin 67. The screw member 73 is adapted to thread into a nut member 76 recessed within the adjacent edge portion of the platen 22 and located inwardly of a precisionly ground bushing 78 confined within the edge portion of the platen 22 for receiving the locating end portion 72 of the pin 67. As shown in FIG. 1, two of the nut members 76 are spaced inwardly of the recesses 31 for receiving the lower two locating and clamping units 65 (FIG. 3) when the platen 22 is in its vertical position.

A cylindrical collar 81 is threaded onto the outer end portion of the pin 67 and is locked by set screws 82. The collar 81 contacts a washer 83 which is engaged by a set of circumferentially spaced telescopic tube units 86 each confining a compression spring 87. Each telescopic spring-loaded tube unit 86 is confined within a corresponding hole formed within the side wall 16 and is guided by an aligned hole within a circular bearing member 89 recessed into the outer surface of the wall 16. The bearing member 89 also supports the pin 67 for rotation and forms a stop for the end portion 72 of the pin 67 to limit outward movement of the pin 67 within the bushing 69.

The pin 67 also has a center air flow passage 92 which connects with a passage 93 with the shank portion 74 of the screw member 73. A set of three circumferentially spaced and axially extending grooves (not shown) are formed within the threads of the screw member 73 and connect with the passage 93 by corresponding radial passages 96. The grooves open to a cavity 97 formed within the platen 22 adjacent the inner end of the nut member 76. Pressurized air is directed through the outer end of the passage 92 and flows through the passages 93 and 96 and then through the grooves within the screw member 73 for blowing any metal chips within the threads into the cavity 97 and downwardly onto the base plate 14.

As mentioned above, the locating and clamping units 65 precisely locate the platen 22 with respect to the side walls 16 of the fixture assembly 10 when the unit 65 is rotated clockwise and tightened in its clamped and locating position as shown in FIG. 4. When it is desired to move the platen 22, the corresponding set of four locating and clamping units 65 are sequentially unthreaded or rotated counterclockwise. This causes each screw member 73 to unthread from the corresponding nut member 76 and the locating end portion 72 to be retracted from the corresponding bushing 78. The telescopic tube units 86 press the pin 67 outwardly to its full retracted position when the screw member 73 is retracted from the nut member 76.

As also shown in FIG. 4, a set of wiper units 101 are mounted on opposite sides of the platen 22 and slidably engage the inner surfaces of the side walls 16 to keep metal chips from flowing between the platen 22 and the side walls 16 and into the horizontal tracks 18. The arcuate tracks 19 are provided with arcuately shaped solid horns (not shown) which fill the tracks 19 and are secured to the platen 22. The horns slide within the tracks when the platen 22 is shifted between its horizontal and vertical positions.

Referring to FIGS. 9 and 10, it is important for the platen 22 to be precisely located in either its horizontal position or its vertical position before the locating and clamping units 65 are engaged and tightened by clockwise rotation. Accordingly, an adjustable stop screw 104 (FIG. 9) is threaded into a bracket 105 secured to the right side wall 16 by a set of screws 107. A similar screw 104 and bracket 105 are secured to the left side wall 16, and each screw receives a lock nut 109. The screws 104 are adjusted to form a precision stop for the forward movement of the platen 22 when the platen returns to its horizontal position by rotation of the ball screws 38. As shown in FIG. 10, the rearward portion of the platen 22 is precisely located when the platen is horizontal position by means of a pair of vertically adjustable stop screws 110 each of which is threaded into a support block 112 mounted on the base plate 14. Each screw 110 receives a corresponding lock nut 113, and a wear pad 116 is secured to the bottom of the platen 22 for each of the stop screws 110.

Referring to FIG. 11, the precise elevation of the platen 22 in its vertical position is determined by a pair of adjustable vertical pins 119 which are supported in corresponding vertical holes 121 within the side walls 16 of the fixture assembly 10. The pins 119 are located directly under the rollers 34 when the platen 22 is in its vertical position. Each pin 119 is precisely adjusted by a few thousandths of an inch in the vertical direction by rotation of an adjustment screw 123 threaded into the base plate 14 directly under the hole 121. A lock screw 124 secures the adjustment screw 123 after the pin 119 and screw 123 are precisely set. Another pair of adjustment pins 119 and screws 123 (not shown) are located within the forward portions of the side walls 16 and are positioned directly under the rollers 34 when the platen 22 is in its horizontal position. These adjustment pins and screws provide for precisely positioning the forward end portion of the platen 22 in its horizontal position and cooperate with the rear adjustment screws 110 (FIG. 10) to establish a precision position of the platen 22 in a horizontal plane before the locating and clamping units 65 are engaged.

When the platen 22 is in its vertical position, horizontal adjustment of the lower portion of the platen 22 is accomplished by a pair of horizontal adjustment screws 128 (FIG. 10) which are threaded into corresponding support blocks 129 secured to the base plate 14. The forward ends of the adjustment screws 128 engage a corresponding pair of blocks 131 (FIGS. 4 and 10) secured to the underneath surface of the platen 22. As shown in FIG. 3, an opening or hole 132 is formed within each side wall 16 at the lower end of the track 19, and similar openings or holes 133 and 134 are formed within each side wall at opposite ends of the track 18 to provide for the flow of coolant oil from the ends of the tracks 18 and 19 and thereby keep the tracks free of metal chips.

CONSTRUCTION OF THE DUAL TORQUE WRENCH

Figure 6:
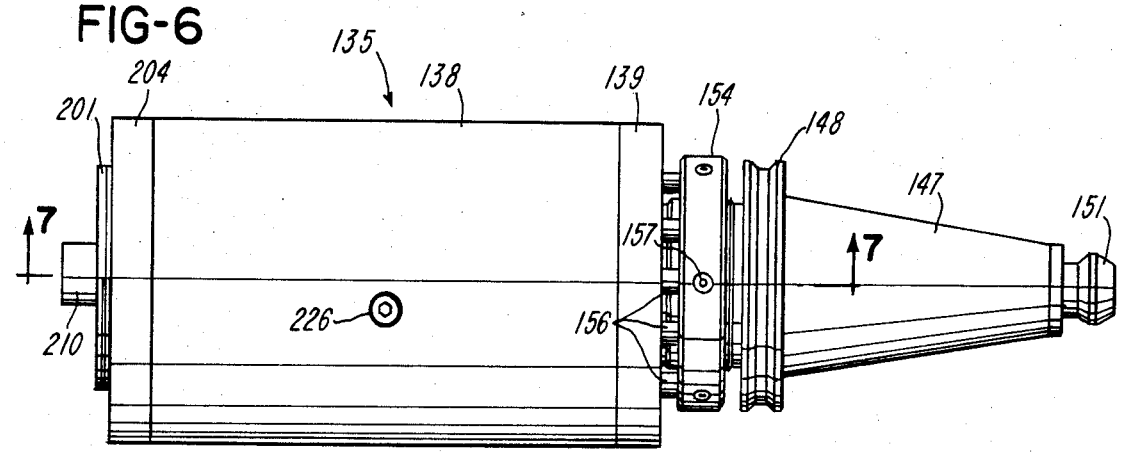
FIG. 6 is an elevational view of a dual-torque wrench used to rotate each of the locating and clamping units shown in FIG. 4.
Figure 7:
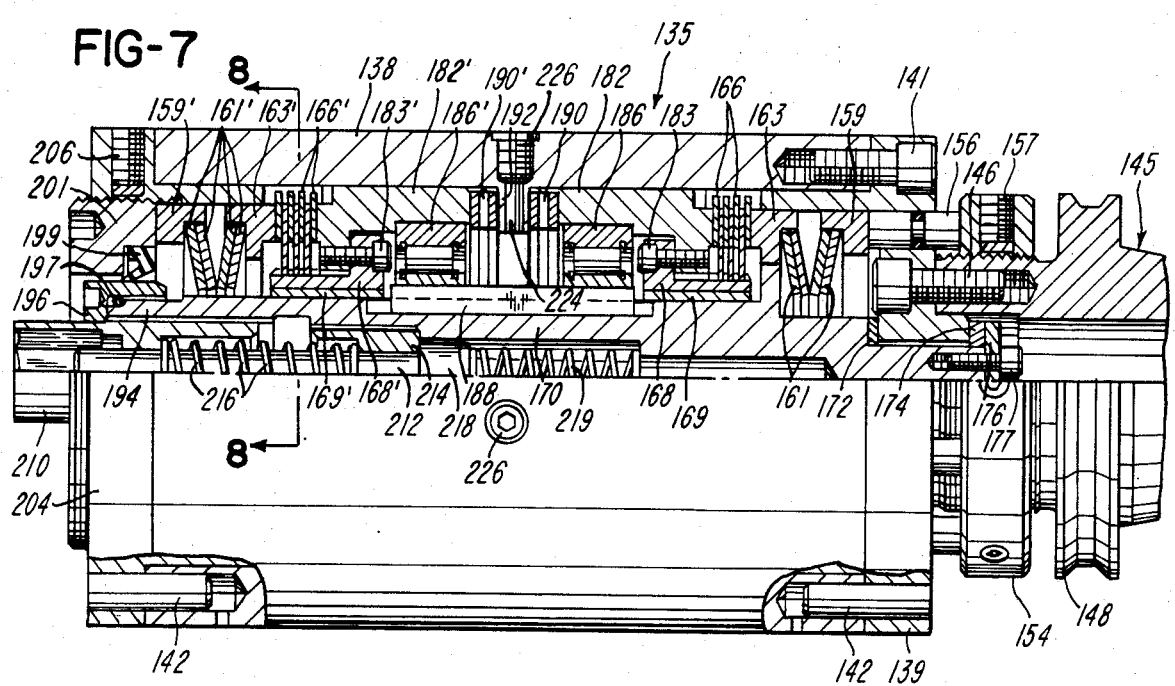
FIG. 7 is a part axial section of the wrench taken generally along the line 7—7 of FIG. 6.
Figure 8:
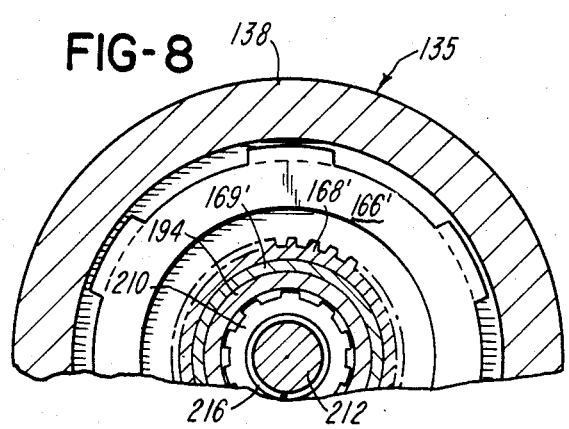
FIG. 8 is an enlarged fragmentary section of the wrench taken generally on the line 8—8 of FIG. 7.

As mentioned above, the rotation of the ball screws 38 and the rotation of each of the locating and clamping units 65 are controlled by a special wrench or wrenches which are transferred to the spindle of the machining center by an automatic tool changer. A preferred dual torque, reversible wrench 135 is disclosed in connection with FIGS. 6-8. The wrench 135 includes a cylindrical housing 138 which receives an end cap 139 secured by a set of screws 141 and located by alignment pins 142. The end cap 139 receives a drive hub or member 145 which is secured to the end cap by a set of screws 146. The drive member 145 has a tapered shank portion 147 which mates with a tapered bore (not shown) in the spindle of the machining center. The drive member 145 also has a grooved collar 148 which is used for transferring the wrench 135 by an automatic tool changer. A knob 151 (FIG. 6) is secured to the shank portion 147 and is used for locking the shank portion within the spindle.

An annular adjustment nut 154 is threaded onto the drive member 145 and engages the outer ends of a set of circumferentially spaced pins 156 which extend axially through corresponding holes within the end cap 139. The adjustment nut 154 is locked to the drive member 145 by set screws 157. The inner ends of the pins 156 engage a ring 159 which is slidably supported within the end cap 139 and receives a pair of annular disk springs or spring washers 161. The spring washers 161 engage another pair of spring washers 161 which are retained by another ring 163 also slidable within the end cap 139. The ring 163 engages a friction clutch disk pack 166 having alternate clutch disks splined to the housing 138 and interfitting clutch plates splined to a bearing ring 168. The ring 168 is provided with a cylindrical bearing 169 which rotates on an elongated shaft 170 extending through the center portion of the housing 138.

The inner end portion of the shaft 170 supports a set of thrust bearing washers 172 and 174 which confine the end cap 139 therebetween, and a retainer washer 176 is secured to the shaft 170 by a set of screws 177. The bearing ring 168 is secured to a drive ring 182 which is adapted to rotate within the housing 138, and a set of screws 183 secure the bearing ring 168 to the drive ring 182. The drive ring 182 carries a one-way "overrunning" clutch or drive unit 186 which has an inner race mounted on the shaft 170 and secured by a key 188.

A needle-type thrust bearing 190 is located between the inner end surface of the drive ring 182 and an inwardly projecting circumferential rib 192 formed as an integral part of the housing 138. The shaft 170 has a tubular outer end portion 194 which threadably receives a sleeve 196 confining an O-ring resilient seal 197. The outer surface of the sleeve 196 is engaged by a resilient sealing ring 199 retained within an adjustment ring 201. The ring 201 threads into an outer end cap 204 secured to the outer end of th housing 138 by another set of screws 141 and locating pins 142. Set screws 206 lock the ring 201 after the ring is adjusted.

The parts or components described above within the inner portion of the housing 138 are used for applying a counterclockwise torque to the shaft 170. These parts or components are duplicated within the outer portion of the housing 138 and are used for applying a clockwise torque to the shaft 170. Accordingly, the components used for applying a clockwise torque are identified with the same reference numbers but with a prime mark, for example, 159', 161', 163', etc.

The outer end portion 194 of the shaft 170 confines a tubular socket element 210 which is splined to the shaft portion 194 for axial movement and receives a slidable pusher pin 212. The pin 212 is supported within a bearing 214 which engages a shoulder within the shaft 170, and a compression spring 216 extends between the socket element 210 and the bearing 214. The pusher pin 212 has an enlarged head portion 218 which engages the inner end of the bearing 214, and a compression spring 219 extends between the head portion 218 and another shoulder within the shaft 170. Thus the socket element 210 may be pressed inwardly on the pin 212 against the spring 216, and the pin 212 may be pressed inwardly within the shaft 170 against the spring 219.

The dual torque wrench 135 receives a supply of lubricating oil through one hole 224 within the housing 138, and the hole receives a plug 226. Another hole 224 and plug 226 are circumferentially spaced on the housing 138 slightly over 90°, and the second hole defines the overflow or level of oil within the housing when the first hole 224 is located on top and is used for supplying oil to the housing.

As mentioned above, the dual torque reversable wrench 135 described above in connection with FIGS. 6–8 is adapted to be driven by the spindle of the machining center. When the wrench 135 is rotated clockwise to engage and tighten one of the locating and clamping units 65, the shaft 170 and socket element 210 are driven through the friction clutch 166', drive ring 182' and one-way clutch 186' while the clutch 186 overruns. The maximum torque applied during tightening of each locating and clamping unit 65, is determined by the axial position of the adjustment ring 201 which determines the force exerted by the spring washers 161' against the clutch disk pack 166'. When it is desired to untighten and disengage each of the locating and clamping units 65, which requires a higher torque, the shaft 170 and socket element 210 are driven counterclockwise through the friction clutch 166, drive ring 182 and the one-way clutch 186 while the clutch 186' overruns. The higher torque in the counterclockwise direction is produced by adjusting the nut 154, the pins 156 and ring 159 axially so that the spring washers 161 exert a greater force against the clutch ring 163 to produce higher friction within the clutch pack 166.

Referring to FIG. 12, instead of driving the projection 71 of each of the locating and clamping units 65 directly with the socket element 210 of the reversable wrench 135, an adaptor 230 is inserted into the socket element 210 and retained by cross pin 231. The adaptor 230 includes a forwardly projecting square shank 233 which receives a standard commercially available socket 235. A cross pin 236 secures the socket 235 to the shank 233. The socket 235 is adapted to float slightly with respect to the socket element 210 to eliminate the need for exact alignment of the axis of the wrench 135 with the axis of each of the locating and clamping units 65. Also, when the socket 235 wears after an extended period of use, it may be easily replaced.

OPERATION OF FIXTURE SYSTEM

The fixture assembly 10 and the dual torque wrench 135 are used on a machining center to machine the six sides of a pump housing or other part P according to a programmed cycle or sequence of operations. After the part is secured to a fixture plate 60, the fixture plate is mounted on and secured to the platen 22 of a fixture assembly 10 supported by a pallet 12 which, in turn, is supposed by an indexing unit forming part of the machining center. The pallet is indexed to the machining station where all of the machining operations required on four sides of the part P are performed according to the predetermined program.

After the four sides of the part P are machined, the torque wrench 135 is transferred to the horizontal spindle by the automatic tool changer. The machine program then calls for the torque wrench 135 to unclamp each of the four locating and clamping units 65 which locked the platen 22 in its horizontal position. The wrench 135, or preferably another similar wrench set at a different torque, is then used to engage the nearest end of one of the ball screws 38 for rotating the ball screws to shift the platen 22 and the fixture plate 60 with the attached part to a vertical position for machining the other two sides of the part P. It is desirable that a probe or contact sensor of the type disclosed in U.S. Pat. No. 4,477,976, be used in the sequence of operations to check that each unit 65 is in its fully retracted position or fully engaged position and that the platen 22 is in its vertical position or horizontal position.

After the platen 22 is moved to its vertical position, the torque wrench 135 is again used for engaging each of the four units 65 which precisely locate and clamp the platen 22 in its vertical position, as shown in FIG. 3. As mentioned above, the probe is again selected to insure that all of the units 65 are fully engaged and tightened. After the two sides of the part P are fully machined, the above operations are repeated with the exception that the ball screws 38 are rotated in the opposite direction to return the platen 22 and the fixture plate 60 to its horizontal position. The pallet 12 is then indexed to the loading and unloading station while simultaneously another pallet 12 and another fixture assembly 10, fixture plate 60 and part P are indexed to the machining station where the above cycle of operations is repeated.

From the drawings and the above description, it is apparent that a fixture system constructed in accordance with the invention provides desirable features and advantages. For example, the fixture system substantially reduces the cycle time for completely machining a part which must be repositioned or refixtured in order to machine all of its faces or surfaces. That is, substantial time is saved by eliminating the set-up time required to position a part for machining some surfaces while it is supported by one fixture plate and then removing the partially machined part from the fixture plate and mounting the part on another fixture plate which must then be positioned to complete the machining of the part. As a result, the fixture system of the invention reduces the inventory of fixtures and reduces down time of the machining center to provide for a more efficient machining operation. Additional savings results from reducing damage to accurately machine surfaces caused by repeated loading and unloading of the parts onto different fixture plates and the handling of the fixture plates and parts.

As another advantage, the locating and clamping units 65 provide for precisely locating and rigidly clamping the platen 22 to the side walls 16 of the fixture assembly 10 after the platen is positioned in either its horizontal or vertical position by means of the adjustment screws described in connection with FIGS. 9–11. Furthermore, the dual torque reversible wrench 135 or a similar single torque wrench provides another important advantage in that it permits the spindle of the machining center to be used not only for shifting the platen 22 between its horizontal and vertical positions but also for engaging and disengaging all of the locating and clamping units 65. The adjustable nuts 154 and 201 of the wrench 135 also provide for selecting the maximum torque desired for tightening the unit 65 and for untightening the units. In addition, the compression spring 216 within the shaft 170 of the wrench 135 provide for slight axial movement of the socket 235 until the socket rotationally aligns with the hexagonal projection 71 on each unit 65. The pin 212 and spring 219 cooperate to insure engagement of the screw element 73 of each unit 65 with its aligned nut element 76 when the wrench 135 is moved into engagement with each unit 65 in its retracted position.

While the construction of the fixture system and its method of operation herein described constitute a preferred embodiment of the invention, it is to be understood that the invention is not limited to the precise structure and method described, and that changes may be made therein without departing from the scope and spirit of the invention as defined in the appended claims. For example, it is apparent that the fixture assembly 10 could be constructed to locate and clamp the platen 22 at any position between its horizontal and vertical positions.

The invention having thus been described, the following is claimed:

1. A fixture system adapted for use on an automatic machining center having a power driven rotary spindle and means for supporting a part to be machined by different tool elements transferred to the spindle according to a predetermined program, said fixture system comprising a base member, parallel space side walls rigidly connected by said base member, a platen having means for supporting the part, means on said side walls and supporting said platen for tilting movement between a horizontal position and a vertical position, rotary actuating means for moving said platen between said horizontal and vertical positions, rotary tool means including a rotatable housing supporting coupling means for releasably connecting said actuating means to the spindle and for rotating said actuating means in response to rotation of said housing and the spindle, a plurality of rotary locating and clamping units for precisely locating and rigidly securing said platen to said side walls in both said horizontal and vertical positions, said coupling means of said rotary tool means releasably connect each of said units to the spindle to provide for rotating each said unit in response to rotation of said housing and the spindle.

2. A fixture system as defined in claim 1 wherein said means supporting said platen comprise a set of tracks and upper and lower rollers connecting said platen to each of said side walls for movement of said platen between said first and second position.

3. A fixture system as defined in claim 2 wherein said tracks have lower horizontal first portions and upper second portions curving upwardly from said first portions, and said side walls each have an L-shaped configuration.

4. A fixture system as defined in claim 1 wherein said rotary actuating means for moving said platen comprise a pair of parallel spaced elongated screw members supported for rotation, a set of nut members pivotally connected to said platen and receiving said screw members, a flexible drive member connecting said pair of screw members and providing for common rotation of said screw members, and means for driving at least one of said screw members with said rotary tool means transferred to the spindle of the machining center.

5. A fixture system as defined in claim 4 wherein each of said screw members has opposite drive end portions for selectively receiving said rotary tool means.

6. A fixture system as defined in claim 1 wherein each of said rotary locating and clamping units include an axially movable shot pin, means defining a precision bore on said platen for each of said shot pins, said platen supports a nut member adjacent each said precision bore, and a screw member is connected to each of said shot pins for engagement with the corresponding said nut member when said shot pin is rotated by said rotary tool means transferred to the spindle.

7. A fixture system as defined in claim 6 and including means for directing a fluid through each said shot pin and around the corresponding said screw member to provide for cleaning chips from said screw member.

8. A fixture system as defined in claim 1 wherein said means for rotating each of said locating and clamping units comprise a wrench assembly including said housing and a drive end portion for engagement with the spindle, a shaft supported for rotation within said housing, a drive socket supported for rotation with said shaft, and friction drive means for rotating said shaft and said socket with a predetermined maximum torque in response to rotation of said housing by the spindle.

9. A fixture system as defined in claim 8 wherein said drive means for rotating said shaft and said socket comprise a first friction drive and one-way clutch for rotating said shaft in one direction with said housing, and a second friction drive and one-way clutch for rotating said shaft in the opposite direction with said housing.

10. A fixture system as defined in claim 8 and including a rotatably adjustable ring for adjusting the maximum torque transferred from said housing to said shaft and said socket.

11. A fixture system adapted for use on an automatic machining center having a power driven rotary spindle and means for supporting a part to be machined by different tool elements selectively transferred to the spindle according to a predetermined program, said fixture system comprising a base member, a platen having means for supporting the part, means mounted on said base member and supporting said platen for tilting movement between a first position and a second position disposed in angular relation, said means supporting said platen including parallel spaced side walls connected by said base member, means defining a set of tracks on said side walls, a set of rollers connected to said platen at upper and lower levels and supported by said tracks for movement of said platen between said first and second positions, rotary actuating means for moving said platen between said first and second positions, rotary tool means for releasably connecting said actuating means to the spindle and for rotating said actuating means in response to rotation of the spindle, means for precisely locating said platen in both of said first and second positions, said locating means including a plurality of rotary clamping members for rigidly securing said platen to said supporting means in both of said first and second positions, and said rotary tool means being effective to connect selected said clamping members to the spindle and to rotate said clamping members in response to rotation of the spindle.

12. A fixture system as defined in claim 11 wherein first lower portions of said tracks are horizontal, and second upper portions of said tracks are arcuate and curve upwardly from said first portions.

13. A fixture system adapted for use on an automatic machining center having a power driven rotary spindle and means for supporting a part to be machined by different tool elements selectively transferred to the spindle according to a predetermined program, said fixture system comprising a base member, a platen having means for supporting the part, means mounted on said base member and supporting said platen for tilting movement between a first position and a second position disposed in angular relation, rotary actuating means for moving said platen between said first and second postions, said rotary actuating means for moving said platen including a pair of parallel spaced elongated screw members supported for rotation, a set of nut members pivotally connected to said platen and receiving said screw members, rotary tool means for releasably connecting said actuating means to the spindle and for rotating said actuating means in response to rotation of the spindle, means for precisely locating said platen in both of said first and second positions, said locating means including a plurality of rotary clamping members for rigidly securing said platen to said supporting means in both of said first and second positions, and said rotary tool means being effective to connect selected said clamping members to the spindle and to rotate said clamping members in response to rotation of the spindle.

14. A fixture system as defined in claim 13 and including a flexible drive member connecting said pair of screw members to provide for common rotation of said screw members.

15. A fixture system as defined in claim 13 and including means for driving at least one of said screw members with said rotary tool means transferred to the spindle of the machining center.

16. A fixture system as defined in claim 15 wherein each of said screw members has opposite drive end portions for receiving said said rotary tool means.

17. A fixture system adapted for use on an automatic machining center having a power driven rotary spindle and means for supporting a part to be machined by different tool elements selectively transferred to the spindle according to a predetermined program, said fixture system comprising a base member, a platen having means for supporting the part, means mounted on said base member and supporting said platen for tilting movement between a first position and a second position disposed in angular relation, adjustable stop members for precisely positioning said platen in each of said first and second positions, rotary actuating means for moving said platen between said first and second positions, rotary tool means for releasably connecting said actuating means to the spindle and for rotating said actuating means in response to rotation of the spindle, means for precisely locating said platen in both of said first and second positions, said locating means including a plurality of rotary clamping members for rigidly securing said platen to said supporting means in both of first and second positions, and said rotary tool means being effective to connect selected said clamping members to the spindle and to rotate said clamping members in response to rotation of the spindle.

18. A fixture system adapted for use on an automatic machining center having a power driven rotary spindle and means for supporting a part to be machined by different tool elements selectively transferred to the spindle according to a predetermined program, said fixture system comprising a base member, a platen having means for supporting the part, means mounted on said base member and supporting said platen for tilting movement between a first position and a second position disposed in angular relation, rotary actuating means for moving said platen between said first and second positions, rotary tool means for releasably connecting said actuating means to the spindle and for rotating said actuating means in response to rotation of the spindle, means for precisely locating said platen in both of said first and second positions, said locating means including a plurality of rotary clamping members for rigidly securing said platen to said supporting means in both of said first and second positions, said rotary tool means being effective to connect selected said clamping members to the spindle and to rotate said clamping members in response to rotation of the spindle, said locating means further including a plurality of alignment units each including an axially movable shot pin, each of said alignment units supported by said means supporting said platen, means defining a precision bore on said platen for each of said shot pins, and means for moving said shot pin of each said alignment unit axially in response to rotation by said rotary tool means transferred to the spindle.

19. A fixture system as defined in claim 18 wherein said platen defines a central access an annular opening, fixture plate for supporting the part, and means spaced around said opening for securing said fixture plate to said platen.

20. A fixture system as defined in claim 18 wherein said platen supports a replaceable nut member for each of said shot pins, and each said clamping member comprises a screw connected to each of said shot pins for engagement with the corresponding said nut member when said shot pin is rotated.

21. A fixture system as defined in claim 20 wherein each of said screws is releasably connected to the corresponding said shot pin.

22. A fixture system as defined in claim 20 and including means for directing a fluid through each said shot pin and around the corresponding said screw to provide for cleaning chips from said screw.

23. A fixture system as defined in claim 18 wherein said rotary tool means comprise a wrench assembly having a housing and a drive end portion for releasable engagement with the spindle, a shaft supported for rotation within said housing, a drive socket supported for rotation with said shaft, and friction drive means for rotating said shaft and said socket with a predetermined maximum torque in response to rotation of said housing by the spindle.

24. A fixture system as defined in claim 23 wherein said drive means for rotating said shaft comprise a first friction drive and one-way clutch for rotating said shaft in one direction with said housing, and a second friction drive and one-way clutch for rotating said shaft in the opposite direction with said housing.

25. A fixture system as defined in claim 23 wherein said wrench assembly includes spring bias means supporting said drive socket and providing for axial movement of said drive socket relative to said housing.

26. A fixture system as defined in claim 23 and including a spring biased pin disposed within said shaft.

27. A fixture system as defined in claim 23 and including an externally adjustable ring for adjusting the maximum torque transferred from said housing to said shaft and said socket.

* * * * *